ATTENUATION EQUALIZATION DEVICE AND METHOD FOR USING SAME

Filed May 27, 1959 5 Sheets-Sheet 1

INVENTORS
Kenneth Eric Latimer
and
Thomas Oswald
BY
Baldwin & Wight
ATTORNEYS

ATTENUATION EQUALIZATION DEVICE AND METHOD FOR USING SAME

Filed May 27, 1959

INVENTORS
Kenneth Eric Latimer
and
Thomas Oswald
BY
Baldwin & Wight
ATTORNEYS

ATTENUATION EQUALIZATION DEVICE AND METHOD FOR USING SAME

Filed May 27, 1959 5 Sheets-Sheet 3

INVENTORS
Kenneth Eric Latimer
and
Thomas Oswald
BY
Baldwin & Wight
ATTORNEYS

ATTENUATION EQUALIZATION DEVICE AND METHOD FOR USING SAME

Filed May 27, 1959

INVENTORS
Kenneth Eric Latimer
and
Thomas Oswald
BY
Baldwin & Wight
ATTORNEYS

ATTENUATION EQUALIZATION DEVICE AND METHOD FOR USING SAME

Filed May 27, 1959 5 Sheets-Sheet 5

INVENTORS
Kenneth Eric Latimer
and
Thomas Oswald
BY
Baldwin & Wight
ATTORNEYS

3,041,555
ATTENUATION EQUALIZATION DEVICE AND METHOD FOR USING SAME

Kenneth Eric Latimer, London, and Thomas Oswald, Dartford, England, assignors to Submarine Cables Limited, London, England, a company of England Filed May 27, 1959, Ser. No. 816,265
Claims priority, application Great Britain May 29, 1958
18 Claims. (Cl. 333—28)

The invention relates to methods and means for attenuation equalisation of telecommunication cables and in particular to attenuation equalisers suitable for use with submarine cables.

When many submerged repeaters are connected in tandem in a submarine telephone cable system, small errors in equalisation tend to accumulate and it is necessary to provide mop-up equalisation at intervals along the system to prevent the transmission levels at any given frequency from departing too much from their nominal value. These errors of equalisation may be due partly to slight imperfections in the manufacture or design of the repeaters, but there may also be errors due to variations in the characteristics of the cable as compared with their expected values.

The object of the invention is to provide equipment for incorporation in the cable system by means of which final adjustment can be made during cable laying operations or as a final step thereof, by means of external connections on a housing which has been permanently closed in the factory and has preferably undergone a pressure test.

According to the present invention an attenuation equalization device, for incorporation in the transmission path of a telecommunication cable, for example, a submarine cable, consists of a hermetically sealed pressure-resisting housing provided with projecting leads which pass through suitable glands or seals in the wall of the said housing, and containing a plurality of networks, which can be selectively introduced into the transmission path by an operator who suitably manipulates a common control and selection device, performing the following operations, without opening said housing:

(*a*) Selection of certain desired networks from the plurality available, so that their resultant attenuation when they are coupled into the transmission path is estimated to give the desired result.

(*b*) Actuation of memory devices in each of the selected networks.

(*c*) Temporary coupling of all the selected networks into the transmission circuit so that the overall attenuation may be measured.

(*d*) If the result of the selection is satisfactory, the connections of the selected networks are made permanent by soldering inside the housing by means controlled from outside, the soldering of non-selected networks being prevented by the memory device.

(*e*) If the selection is unsatisfactory, the memory is erased and the operations are repeated with any modifications which appear desirable, until a suitable combination is found and made permanent as in (*d*) above.

The equalization device may be a separate assembly or may form part of a repeater.

Although in the embodiments to be described, the functions (*a*), (*d*), and (*e*), above, apparently require the provision of separate physical leads for a common control device, this is more a matter of practical convenience and simplicity than of principle. The power for soldering and certain signals could obviously be transmitted over the transmission circuit by known means of superposition, and any method whereby a control function may be performed inside the housing my some procedure applied outside would be within the spirit of the invention. In one embodiment, gravity is so used. For a non-magnetic housing, magnetic fields would also be applied and other examples will be obvious to those skilled in the art.

The invention is illustrated in the accompanying drawings in which.

Figure 3:
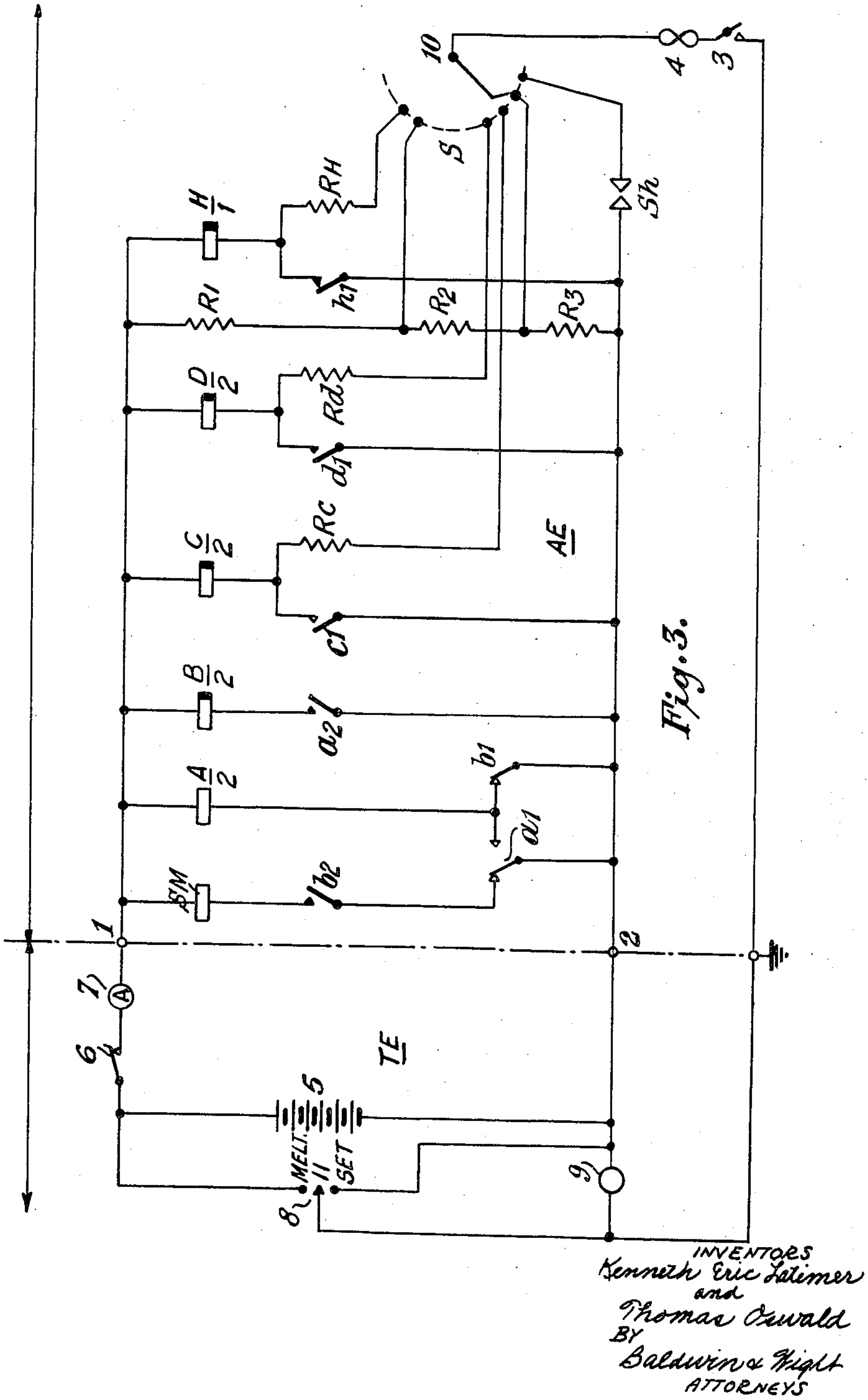
Figure 4:
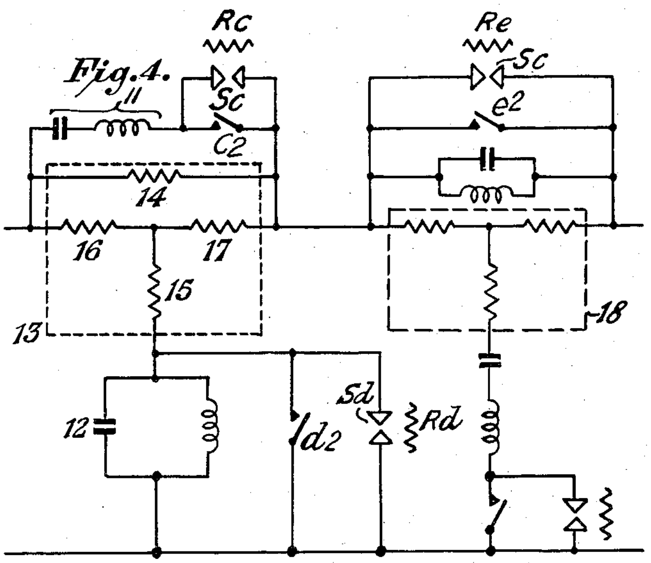
Figure 5:
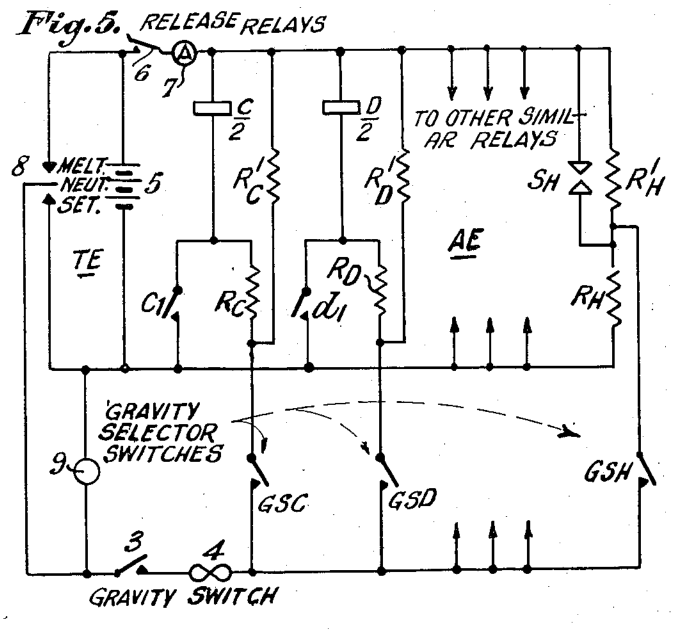

FIGURE 3 shows part of one embodiment of the invention. To the right of the chain-dotted line 2, 2, is the adjusting equipment AE which performs the operations (*b*)–(*d*) and which is installed within the housing, and to the left of line, 1, 2, manual external common control and test equipment TE, temporarily connected to leads passing through seals or glands through the wall of the closed housing;

FIGURE 4 shows an example of four typical equalization networks, associated with two sections of bridged-7 configuration, incorporated in the same housing as the testing and adjusting equipment of FIGURE 3 or FIGURE 5. These networks can be inserted in the transmission path as required by the operator, under control of the adjusting equipment of FIGURE 3 or FIGURE 5 to create the permanent equalization desired in the cable.

Figure 6:
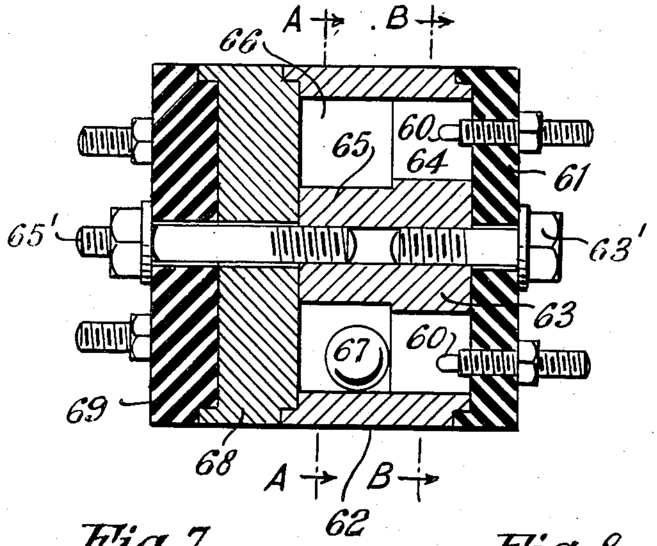
Figure 7:
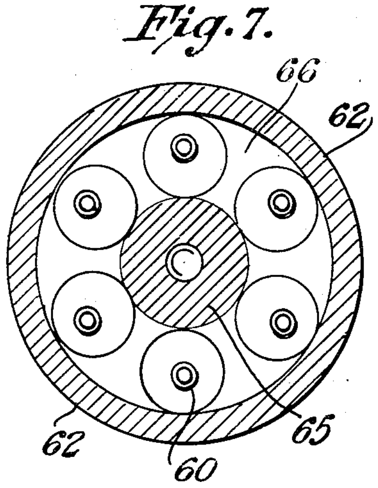
Figure 8:
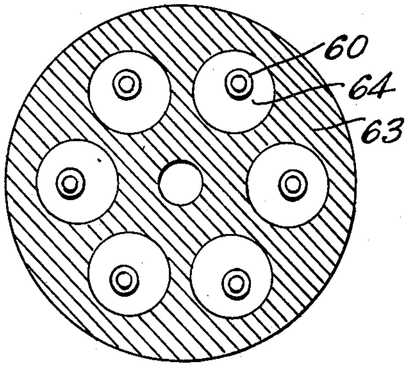
Figure 9:
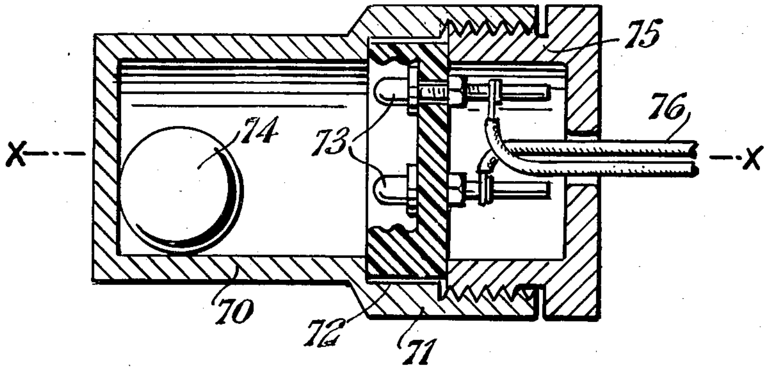
Figure 10:
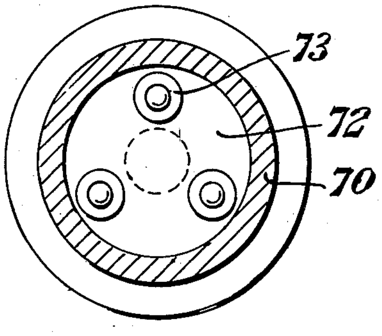
Figure 11:
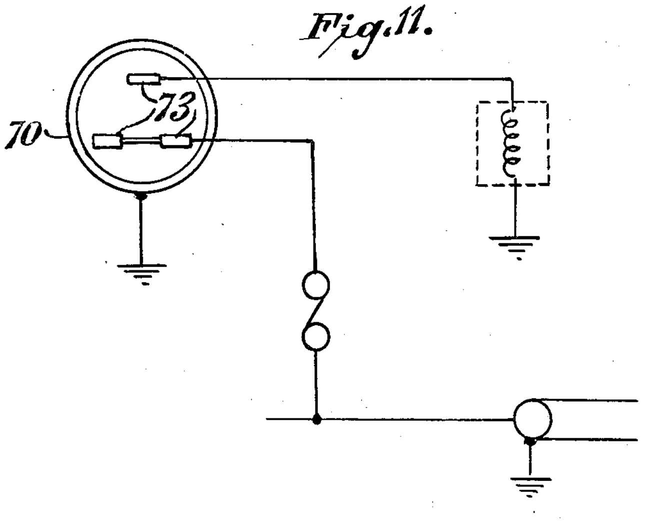

FIGURE 5 is a second embodiment showing part of the testing and adjusting equipment of FIGURE 3 modified to incorporate a multi-way gravity switch as shown in FIGURE 6 in place of the single electro-mechanical uniselector used in FIGURE 3;

FIGURES 6, 7, and 8, show a multi-way gravity switch in cross-sectional elevation and in cross-sectional plan views on lines AA and BB respectively; and FIGURES 9 and 10 are respectively longitudinal and transverse sections of another form of gravity switch, used to control certain auxiliary circuits. One auxiliary circuit is shown in FIGURE 11 in greater detail.

The first step in the design, according to all embodiments, is to decide how much equalization is required to meet any deviation likely to be encountered between the cable attenuation and the repeater gain. Let this amount be $\pm x$ db, this being the maximum amount; it may also be required to provide smaller adjustments, or perhaps no equalization will be required at all.

It is well known in the art that it is only possible to provide a relative gain for purposes of equalization in one part of the frequency band if a loss is introduced in all other parts of the frequency band. Furthermore, for practical reasons, if a loss is to be so introduced, the loss-frequency curve must resemble that of a length of submarine cable, otherwise the submerged repeaters in the vicinity of the equalizer must have specially designed characteristics, which is obviously undesirable from the point of view of the provision of spare repeaters, to say nothing of the inconvenience of manufacture.

It is therefore clear that if last-minute equalization is to be arranged at some point in the cable, the necessary steps to be taken must be:

(*a*) To provide a simulating network which can be described as an artificial cable, having insertion loss-frequency characteristics resembling those of a length of the actual cable. If no equalization is found to be necessary, this network would be inserted without modification.

(*b*) If equalization is found to be necessary, the loss of the above network would be appropriately modified usually by applying reactive arms to that part of it, which would otherwise introduce a constant loss at all frequencies of $x$ db.

Figure 1:
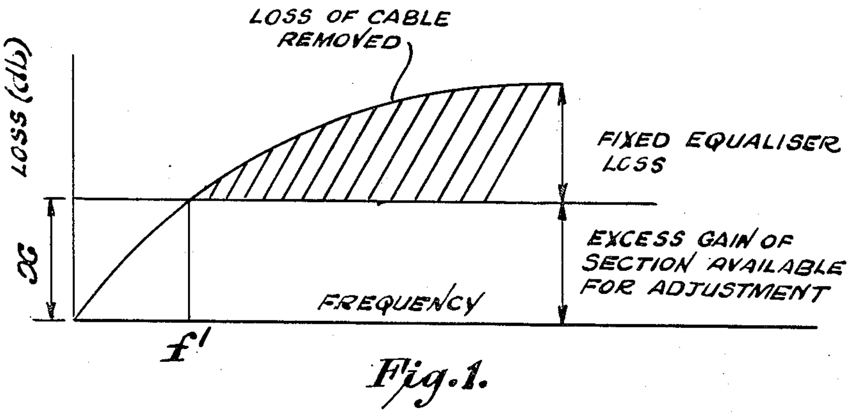
FIGURE 1 shows the attenuation-frequency characteristic of a length of coaxial telecommunication cable.

This is illustrated in FIG. 1, in which the curve represents the attenuation-frequency characteristic of a length of the cable.

It is assumed that the frequency band for which the cable is designed has a lower limit $f'$ so that the portion of the curve to the left of the vertical line at frequency $f'$ is not involved in the working characteristics of the cable. The horizontal line through the point of intersection of the curve and the vertical line $f'$ divides the loss area into an upper shaded portion in which the losses vary with frequency and a lower unshaded portion in which the loss is constant for all frequencies in the transmission band.

It is convenient to divide the network (*a*) above into two parts corresponding to the shaded and unshaded loss areas in FIG. 1, and to restrict the adjustment facilities to the latter. This simplifies the problem.

Figure 2:
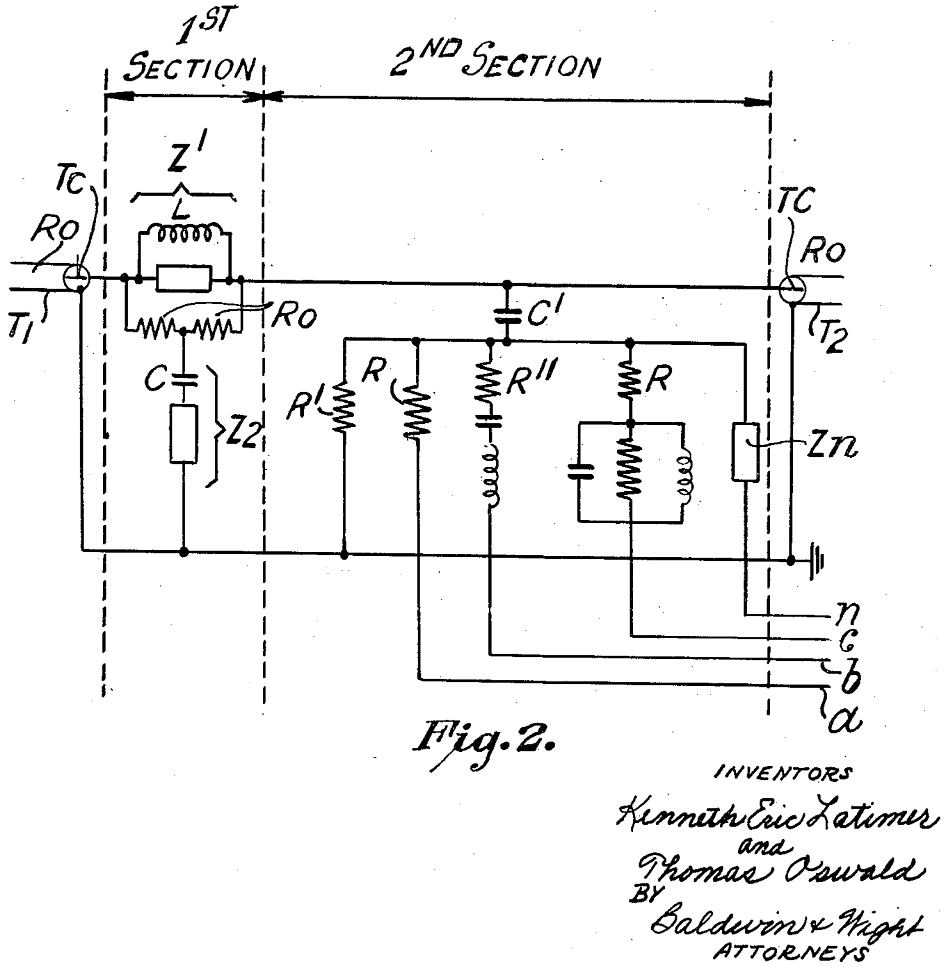
FIGURE 2 shows schematically the subdivision of the transmission circuit into a fixed simulator network and a constant loss network to which variable equalization may then be applied. This is a simple example which can be used but is not the preferred embodiment.

In FIG. 2, the artificial cable network comprises a first section on the left, which simulates the shaded portion of the loss area, FIG. 1, whereas the constant attenuation for all frequencies beneath the shaded portion, is simulated in this case by the resistance R, with which the various equalization networks are associated. These networks are essentially two-terminal shunts; they have the advantage of simplicity, but they have well known disadvantages, such as, excessive interaction and poor return loss.

The first section of the network is of the well known "bridged T" type in which $Z1Z2=Ro^2$ and where $Ro$ is the mean characteristic resistance of the cable.

An additional feature of the circuit shown is that Z1 includes an inductance L in shunt with itself which carries the D.C. power feed current through the equalizer and that Z2 includes a capacitor C in series with itself which preserves the insulation resistance of the D.C. power feed circuit. The components L and C may or may not play an important part in the formation of the equalization characteristic. If this feature is not used, power separation filters will be necessary.

As explained above, a shunt resistance R is required across the circuit in the right hand diagram in those portions of the frequency spectrum which are to be left unadjusted. The leads *a*, *b*, . . . *n* are connected to various shunt arms such as R and $Zn$ which are connected together and via a capacitor C′ to the inner conductor IC of the cable. If no equalization happens to be required, the resistor R would be put in circuit by connecting lead *a* to earth. In addition, if it were desired to cause a loss in the neighbourhood of a certain frequency, not only lead *a* but also another lead such as *b* would be earthed. The lead *b* includes a series resonant circuit which thus places the resistor R″ in parallel with R at the resonant frequency.

If a relative gain is wanted in the neighbourhood of some frequency, a lead such as *c* would be used. This has a resistor R in series with a shunt resonant circuit, which will usually be provided with a damping resistor. At the resonant frequency, a resistance higher than R will be shunted across the main transmission path, but at frequencies well removed from resonance, the impedance in series with R will be negligible. If this circuit is used, the lead *a* would be left open-circuited.

In general any impedance such as $Zn$, which may or may not include R, can be shunted across the main transmission path by suitable earthing of the leads *a* . . . *n*.

The equipment shown as first and second sections (see FIG. 2) is incorporated in a housing which is hermetically sealed in the factory, but which is provided with connection glands at each end for connection to the inner conductor IC of the two coaxial cable terminations T1, T2. The leads *a*, *b* . . . *n*, could be connected as stated, by any of the devices to be described below. The resistance R′, connected permanently between capacitor C′ and earth, ensures that the continuous voltage stress to earth produced by the inner conductor of the cable is withstood wholly by the capacitor C′ and in particular that there is no voltage stress on the insulation of the leads *a*, *b* . . . *n*. The components C′ and R′ may or may not play an important part in the formation of the equalization characteristic. In general, however, R′ will be a high resistance leak, and this is assumed here.

It will be seen that the above embodiment of the equalizer network is only suitable for relatively simple equalizer problems, insertion of individual shunt impedance equalization circuits being effected by means of conductors individual to each of said equalizer circuits and a conductor common to the entire equalizer.

It becomes difficult to provide many steps of adjustment and the impedance varies considerably from the nominal value if much equalization is provided. Consequently, it is preferred to use the network shown in FIGURE 4 in place of the second section of FIGURE 2, in which case a power separation filter would be required.

FIGURES 3 and 5 show different embodiments of the electrical circuitry used to perform the functions of selection, storage, temporary network insertion and the preparation for making the connections permanent, as indicated above.

In FIGURE 3, the selecting means is a uniselector operated by the leads 1 and 2 and by the connection from switch 3 to the case of the repeater. Relays A and B help to operate the uniselector. Relays C, D . . . etc. (but not H) perform several of the functions mentioned above. Each one stores the information whether a particular network is to be inserted or not in the transmission path, by locking itself in if it is operated. Each one is capable of inserting a network element temporarily in the transmission path as will be shown in FIGURE 4. Finally, each one, if operated, prepares a circuit whereby a soldered permanent connection is substituted for a temporary connection if the appropriate signal is given. Similarly in FIGURE 5, the relays C, C . . . etc. perform the same function as the corresponding relays in FIGURE 3, but a multi-way gravity switch is substituted for the uniselector and relays A and B. It will be apparent to one skilled in the art that although the various functions of storage, temporary network insertion and preparation for soldering happen to be performed by one and the same circuit element, the use of separate elements for different functions is still within the scope of the invention. The necessary permanent connections are made preferably by means of devices known as "short circuiting fuses." These devices, which are well known in the art, consist of resistor elements, preferably of the vitreous type, which generate enough heat to melt a small quantity of solder in a tube of insulating heat-resisting material passing through the centre of the spool. The molten solder forms a path between two electrodes, thus establishing the desired permanent connection. These devices are known to be extremely reliable.

Such devices will be hereinafter described with reference to FIGS. 3–6.

Whereas the embodiment shown in FIG. 2 and its variants are severely limited by the number of networks which it is practicable to provide for adjustment purposes, and their mutual interaction the embodiments shown in FIGS. 3–6 are virtually unrestricted in the complexity of the conditions for which they can cater.

Referring to the embodiment of FIGURE 3, for test, adjustment, and setting purposes, three connections are available, two connections being provided through glands with internal connections to the equalizer equipment as indicated at 1, 2, and one earthing connection to the housing itself. These glands are, for convenience, combined with those which are provided for the transmission circuit, to form twin glands, one of which said twin glands is provided at each end of the housing. The storage and switching equipment of FIGURE 3 includes a uniselector and electromagnetic contact-making relays A, B, C, D . . . H. Relay A is fast to operate and release, but the others are of the fast operate-slow release type, as indicated by the slug on the end of each relay rectangle. These relays have contacts such as *a*1, *b*1, *b*2, which are shown in the position they occupy when the relay is deenergized and which change over, open, and close respectively when the relay is energized.

Earth is connected via a gravity switch 3 to be described later and a fuse 4 to the switch wiper 10. The bank contacts S are connected respectively to the relay operating circuits, to a potential divider R1, R2, R3, and so on. The gravity switch 3 may be of similar construction to that shown in FIG. 9 and there may be a similar gravity switch in the same repeater housing for purposes of leak detection using the circuit of FIGURE 11.

The switches would be so orientated that either of them could be closed as required. For preference the two gravity switches could be arranged with their axes in planes at 120° with respect to one another, so that either of the two can be closed as desired, or alternatively so that both of them can be opened. Throughout the operations described here it will be assumed that the switch 3 is closed when required by placing the repeater in a suitable position. This will be possible even at sea, since the switch can tolerate large change of angle without interrupting the connection.

The test equipment TE to be connected to the housing glands comprises a voltmeter 9; an ammeter 7; a switch 6; battery 5, a three position manual switch 8 having a central neutral position for the movable contact 11, the upper position closes a circuit designated "Melt" which gives the signal to make the temporary connections permanent. There is also a lower position which closes a circuit designated "Set" which gives the signal to select a circuit and to cause the identity of the circuit to be stored in the memory device.

The relays C, D . . . individual to the various equalizer circuits are provided with associated resistors R*c*, R*d* . . . which are connected directly between the contact bank S and battery 5 when the corresponding relay is operated, so that the resistor can act as a heating coil. Each resistor R*c*, R*d* . . . is physically associated with a solder fuse S*c*, S*d*, FIG. 4, which are arranged to short the corresponding relay contacts *c*2, *d*2 in the equalizers, FIG. 4, for making permanent connections. When the test equipment TE is plugged in with switch 6 closed, and switch 8 in neutral position, relay A operates via the contact *b*1, and it immediately locks over its own contact *a*1. Relay B is now energized through the contact *a*2 and also operates, opening the contact *b*1. Relay B (and also C, D, etc., including H) are all of the slow release type, although A releases quickly. When it is desired to move on the uniselector 10 by one step, the switch 6 is opened for a period in the order of 100 milliseconds. Relay A releases and remains released when switch 6 recloses because its locking contact *a* has opened, closing the circuit of the stepping magnet SM. Slow release relay B releases after a short delay and opens the circuit of magnet SM, which releases and steps the switch wiper 10 on to the next bank contact. Relays A and B reoperate in turn and A locks up.

By a series of short openings of switch 6, the uniselector S can be stepped to any desired position.

Let it now be supposed that the wiper of uniselector 10 has reached the step where it connects the resistance R*c*. If the switch 8 is in the middle position, it will be seen that voltmeter 9 indicates a full reading; earth, 9, 5, 6, 7, C, R*c*, 10, 4, 3, earth. If the switch 8 is momentarily thrown to "set," shortcircuiting voltmeter 9, relay C will operate and lock via its contact *c*1. On restoring the switch 8 to the middle position, it will be found that the voltmeter 9 now shows a zero reading. This indicates that the relay C has now been locked in its desired position thus achieving the storage of information. The uniselector 10 may now be advanced one step whereupon the wiper will make contact with resistance R*d*. If it is decided not to establish the connection controlled by relay D the switch 8 is left in the middle position and the selector is moved on to the next step. It will be understood there are a succession of relays such as C and D, as many as may be required. When the selector has moved round the bank in this manner, step by step, various relays will be left operated, such as C, whereas others will be left released, such as D. The fact that this is the case can be verified partly by the reading of the voltmeter 9 when the uniselector is swept over the contacts on its bank, and also by the cumulative reading shown by the ammeter 7. If there is any defect in the circuit whereby a relay which should have been locked in is accidently released, this will be indicated by a change in the reading of the ammeter 7.

Relay H, although it is similar to the other relays C, D etc., has a different function, namely, to ensure that the fuse 4 is blown when the process of adjustment is complete. Relay H is not locked in until a later stage in the operations.

One of the contacts of relays C, D, etc., is shown in FIG. 3 and serves to hold the selected relays operated, whereas the other contact is associated with the equalizer circuit and makes the desired connections in a temporary way until tests have been carried out. As long as the battery is maintained across terminals 1 and 2, or at least not interrupted for a period longer than 100 milliseconds, necessary to advance the uniselector, the equalizer will remain in its adjusted condition and transmission tests may be made through it (a long interruption would, of course, erase the memory). If it is proposed to connect the equalizer in a submarine cable system, in which the transmission circuits have a high voltage with respect to earth, it may be advisable to open the gravity switch 3 and disconnect the external lead from the repeater housing since this will diminish the voltage between the relay contacts and the windings to a value such as would obtain under normal operating conditions. If the results of test are unsatisfactory, the battery supply is cut off by opening switch 6. The relays will then release, and the equalizing steps are repeated. When it has been ascertained that the adjustments made are correct, the uniselector 10 is stepped round once more, for the purpose of making the connections permanent. At each step it is first verified that the correct voltage is observed on the voltmeter 9 and that the ammeter 7 has not changed its reading. The switch 8 is then placed in the position "melt." If the relay at the step in question has previously been operated, placing 8 in the position "melt" will cause the resistor associated with the relay, such as R*c*, see FIG. 4, to melt the solder of the short-circuiting fuse, S*c*, which thus makes a permanent connection across the contact *c*2 of this relay: earth, 3, 4, 10, R*c* *c*1, battery 5, switch 8, earth. These contacts are already closed, so there will be no change in the transmission characteristics of the equalizer. When the uniselector reaches a relay, such as D, which is not already operated, even if the switch 8 is placed in the position "melt," nothing would happen because the resistance R*d* is not connected to terminal 2 via *d*1.

During this process, or indeed during the process of selection, the position of the uniselector can be verified by means of the potentiometer circuits R1, R2, R3. Tappings from this potentiometer are connected to various contacts of the uniselector which can be identified by the readings of the voltmeter 9.

When all the selected short-circuiting fuses have been melted, as described, the switch 6 can be opened for a prolonged period so as to allow all the selector relays to release. Transmission tests can now be carried out to ascertain that the equalizer is indeed adjusted correctly. When this has been proved, the uniselector is moved to relay H, which is then operated by moving the switch 8 to the position "set." The short-circuiting fuse S*h* is then melted by moving the switch 8 to the position "melt." The wiper of uniselector 10 is then moved to make contact with the short-circuiting fuse S*h* and the switch 8 is moved into the position "melt." This blows the high tension fuse 4, a fact which can be verified by means of the voltmeter 9. The leads 1 and 2 are now disconnected and capped by injection moulding. The assembly of the equalizer, end caps, cable clamps, etc., is then completed and the equalizer can be laid.

FIG. 4 shows, by way of example, one form of equalizer circuit. The circuit designer is completely free to place the relay contacts and short-circuiting fuses where he wishes. In the example shown a bridged-T type equalizer has been chosen with a reactive series arm 11 and a reactive shunt arm 12, which are potentially inverse. In the preferred embodiment they are not numerically inverse. They are associated with a bridged-T pad 13, in which the resistors 16 and 17 are each equal to the impedance of the transmission path. The resistors 14 and 15 limit the amount of change of attenuation introduced by the networks 11 and 12 respectively. The resistor 14 in conjunction with the network 11, introduces a maximum loss (when the frequency is zero or infinite) which is half the amount of loss introduced by the resistor 15 in conjunction with the network 12 (again at zero or infinite frequency). In this preferred arrangement, therefore, it is possible to provide four steps of equalization by closing the contacts *c*2 and *d*2 temporarily in different combinations, and by making a selected combination of connections permanent by corresponding operation of the short-circuiting fuses R*c* and R*d*. These steps are given in the following table:

| Step No. | Contacts operated | |
|---|---|---|
| | *c*2 | *d*2 |
| 1 | − | + |
| 2 | + | + |
| 3 | − | − |
| 4 | + | − |

In this table, + signifies that the contact is closed, and − that it is open. Step 1 gives a constant loss at all frequencies, and step 4 gives the greatest possible reduction in loss at the resonant frequency.

The resistors R*c* and R*d* are of course the corresponding resistors shown in FIG. 3, and the contacts S*c* and S*d* are the contacts which are joined together by molten solder when the resistors R*c* and R*d* respectively are heated.

It is not necessary to include the resistor 14 as a physical element. By suitable design it can be incorporated in the resistors 16 and 17, so that the network appears to be a pad, although it differs somewhat from the characteristic impedance of the circuit in which it is placed. This tranformation has been introduced into the second network shown on the right of FIG. 4, in respect of the pad 18. It is not necessary that the reactance elements should all operate on different pads. As long as the frequencies of resonance of the reactance networks are widely different, and if the same steps of equalisation are acceptable, a number of different reactance networks may be associated with the same pad, with some advantage as explained below.

It has already been shown that if a reduction of attenuation is desired at some particular frequency, this can only be attained by inserting attenuation at all other frequencies. Further the amount of attenuation so introduced, at all other frequencies, must be proportional to the attenuation of the cable at such other frequencies. Thus if a pad, such as 13, is to be introduced into the circuit and no particular equalisation is desired at the resonant frequency of the reactance arms 11 and 12 (this would of course correspond to step 1 in the table above) then one must add an artificial line in tandem with the pad 13, such as to build up the loss of the pad 13 to give an attenuation which is proportional to that of the cable, as already explained above, see FIG. 1. It is thus clear that the fewer pads such as 13 which are introduced into the circuit and the lower their value the less will be the overall attenuation of the equaliser at the highest frequency transmitted. This difficulty does not exist with the type of equaliser shown on the right hand side of the drawing, since the pad 18 is only introduced in the neighbourhood of the resonant frequency of the reactance networks, so that only the desired effect is produced, and fixed equalisation is not required.

It will be obvious to one skilled in the art that many modifications may be made to the embodiments described without departing from the spirit of the invention.

Thus for example, instead of the conventional drive of the uniselector by means of a stepping magnet, one could use an electric motor or a mechanical drive. The latter could be powered by means of an eccentric weight mounted on a shaft. By rotating the housing about an axis parallel with that of the shaft, the eccentric weight will provide a gravity torque which will cause the shaft to rotate relative to the housing and thus operate the selector mechanism directly or through appropriate gearing.

If it is inconvenient to rotate the housing many times owing to the risk of damaging the leads, this may be avoided by swinging the weight round the shaft in the same fashion as with a rattle, i.e. by tilting the housing in various directions without rotating it, also by making use of centrifugal force, so that the weight is acted upon by a gravitational and/or centrifugal force which is continually changing its direction. In order to facilitate this process the housing can be supported at its lower end in gimbals. The housing would be steeply inclined, and the top end would be moved round in a circle so that its axis sweeps out an inverted cone with a semi-vertical angle of 5–10°. Experiments on a full scale assembly have shown that a reliable drive may be obtained under these conditions.

If the housing or part thereof is non-magnetic, the above weight can be replaced by a permanent magnet or a bar of ferromagnetic material. The shaft can then be rotated by an external magnetic field.

According to a fourth embodiment, the selector is replaced by a plurality of gravity switches or by a device similar to that shown in FIG. 6 constituting, in effect, a plurality of gravity switches. By suitable manipulation of the repeater housing, any one of a number of contacts can be closed in order to operate relays and short-circuiting fuses in the manner described above.

The gravity switch shown in FIGS. 6, 7 and 8 comprises an insulating base 61 in which are fixed a number of contacts 60 protruding above and below the base. To the base is bolted a cylinder or pot 62, in the bottom or one end 63 of which is a central tapping for a fixing bolt 63'. A series of circular cavities 64 are provided in the base 63 within each of which one of the contacts 60 is eccentrically located. The base 63 is also provided with a coaxial boss 65 through which the central tapping is extended to receive a second fixing stud 65' by means of which a metal closure member 68 together with an insulating cover 69 are secured in position on the open end of the cylinder 62. The metal closure member 68 is located in a circumferential shoulder in the cylinder 62 and abuts against the end of the boss 65 so as to provide an annular chamber 66 surrounding the boss 65 and within which is located a gold plated ball 67 which according to the positions of the complete switch can be positioned away from all the contacts 60 or seated in one of the cavities 64 so as to make contact with the contact member 60 therein. Where more contacts are required the cylinder 62 may be constructed with pockets at both ends i.e. the left hand end may be the mirror image of the right hand end with the pockets 64.

Referring now to FIGURES 9 and 10 there is shown another construction of a gravity operated switch comprising a tubular container 70 having a shouldered end 71 within which is located a plug 72 of insulation material, e.g. that sold under the trademark "Perspex" or of polytetrafluorethylene in which there are three metallic studs indicated at 73. Within the chamber 70 is a similar gold plated ball 74 for engagement with the studs 73 which may also be gold plated. The studs 73 project on the opposite side of the chamber and are enclosed in a detachable screw cap 75 having a central aperture for the passage of the lead wires 70 connected to the opposite ends of the studs 73.

The dimensions of the tube 70, the studs 73 and the sphere 74 are such that when the device is placed with its axis X—X, which extends at right angles to the longitudinal axis of the casing in a vertical position, the sphere rests firmly on the three studs without touching the sides of the tube. When however the device is moved to an angle of approximately 45° to the vertical position, the sphere is resting against one or two of the three studs, and the side of the metal tube. The tube, according to the preferred embodiment, is connected to earth, as shown in FIG. 3, which also shows the other connections to the device in which case it is used as a single contact switch.

The gravity switch is preferably placed in the housing in such a way that its axis is athwart the axis of the housing, so that it may be inverted, or turned at 45°, merely by rotating the repeater housing on its storage rack.

The same kind of switch may also be used in the same housing, as mentioned above, to control a moisture detection circuit without interfering with the object of the invention. This circuit is shown in FIGURE 11. When the moisture circuit is in use the housing is turned so that the sphere 74 rests on the three contacts. When it is desired to make a transmission measurement, or adjust the equalizer, the housing is turned through 180°, so that the sphere is at the opposite end of the tube from the three contacts. When it is desired to blow the fuse, the housing is placed in an intermediate position, as mentioned above, so that one end of the fuse is earthed. It is then sufficient to apply a few volts for example, from an accumulator, to the main transmission path to blow the fuse without endangering other components in the housing thus removing the moisture detector circuit when it is no longer needed.

The circuit of FIG. 3 can be simplified by replacing the uniselector and stepping relays A, B by a multiple-position gravity switch such as that shown in FIGS. 6, 7 and 8 or in FIGS. 9 and 10, as shown in FIG. 5 for the C relay and D relay equalisation circuits. In FIG. 5, GSC, GSD are contacts of the gravity selector switch, FIG. 6, for closing the respective operating circuits of relays C, D.

Since there is no need for a temporary connection for testing purposes in the H circuit, the relay H is no longer strictly required, and gravity contacts GSH can directly close the heating circuiting for resistor RH by which fuse connector SH is melted.

In this circuit it is not necessary to close the selection circuits in any fixed sequence. It will be observed that when the correct cavity in the device of FIG. 6 has been selected, the housing may be rotated into any other position to operate other gravity switches as long as the housing is suitably inclined to urge the sphere into the contact engaging position.

In order to provide some check that the desired relay has been selected, various identification resistors such as $R_c^1$, $R_d^1$, $R_h^1$ are provided. These can be arranged in various ways so that it is possible to determine which contact has been closed by resistance, current or voltage measurements outside the housing. As a further means of identification, a replica of the device shown in FIG. 6, preferably partly made of transparent material, is rigidly coupled to the outside of the housing and orientated in the same way as the device mounted inside the housing. By observing the motion of the ball in the replica, correct manipulation of the housing is greatly simplified.

What is claimed is:

1. An attenuation equalizer device for the incorporation of permanent fixed equalization in a telecommunication cable system comprising a cable having a closed housing therein, and including a transmission circuit, attenuation circuits mounted within the closed housing, said circuits including switching equipment for modifying the characteristics of said circuit, and terminal means located outside the housing and coupled to said circuits for causing one or more of a plurality of temporary internal modifications to the circuit within the housing, means for testing the modifications and means for making permanent internal modifications to couple selected ones of said attenuation circuits to said transmission circuit.

2. An attenuation equalisation device as claimed in claim 1 wherein the circuits within the housing comprise switching equipment for modifying the characteristics of said circuits.

3. An attenuation equalisation device as claimed in claim 2 wherein said switching equipment comprises a rotary wiper switch to contacts with which individual equalisation circuits of different characteristics are associated.

4. An attenuation equalisation device as claimed in claim 2 wherein said switching equipment comprises gravity operated switches controlled by movement of the housing.

5. Attenuation equalisation device as claimed in claim 4 and wherein said switch enclosure is cylindrical with an insulating base carrying said contacts arranged in a coaxial circle.

6. An attenuation equalisation device as claimed in claim 1 and comprising electromagnetic contact making relays for making temporary internal modifications, and low-temperature melting fuses for making permanent modifications.

7. An attenuation equalisation device as claimed in claim 6 and wherein the heating circuits for said fuses include contacts of said relays.

8. Attenuation equipment as claimed in claim 6 and wherein said contacts are each inset in a recess, the top of which is of a size relative to the ball to allow the ball to make contact when seated in the top of the recess.

9. An attenuation equalisation device as claimed in claim 1 and comprising a plurality of permanent connection devices arranged for operation in sequence selectively to couple a series of stages of equalisation circuits covering successively greater proportions of equalisation.

10. Attenuation equalisation device as claimed in claim 1 wherein said switching equipment includes gravity-operated electrical contact-sets including a switch having an enclosure which constitutes one terminal, a plurality of insulated point contacts protruding into said enclosure and a contact ball in said enclosure for making connections between said contacts and said enclosure.

11. Attenuation equalisation device for incorporation in a telecommunication cable system comprising a closed housing, attenuation circuits inside said closed housing, two sets of interconnection terminal equipment which are fixed in said closed housing so as to extend internally and externally thereof and which are connected internally to said attenuation circuits and are arranged externally for permanent connection respectively to incoming and outgoing cable terminations, and a plurality of sets of interconnection terminal equipment on said closed housing, by means of which the electrical characteristics of said attenuation circuits inside said closed housing can be permanently modified in any one of a plurality of different ways to give any one of a plurality of different overall attenuation characteristics to said device and thereby provide mop-up equalisation.

12. Attenuation equalisation device for incorporation in a telecommunication cable system comprising a closed housing, attenuation circuits inside said closed housing, two sets of interconnection terminal equipment which are fixed in said closed housing so as to extend internally and externally thereof and which are connected internally to said attenuation circuits and are arranged externally for permanent connection respectively to incoming and outgoing cable terminations, and a plurality of sets of interconnection terminal equipment on said closed housing between which any one or more of a plurality of different permanent connections can be made between said sets of interconnection terminal equipment for modifying the overall attenuation characteristics of said device to provide permanent mop-up equalisation, and which is constructed to facilitate the sealing off of any such permanent connections and any of said sets of interconnection equipment not used for attenuation modifying purposes.

13. Attenuation equalisation device for incorporation in a telecommunication cable system comprising a closed housing, attenuation circuits inside said closed housing, two sets of interconnection terminal equipment which are fixed in said closed housing so as to extend internally and externally thereof and which are connected internally to said attenuation circuits and are arranged externally for permanent connection respectively to incoming and outgoing cable terminations, a plurality of sets of interconnection terminal equipment on said closed housing to which control equipment can be temporarily connected, and switching devices incorporated in said attenuation circuits for modifying the electrical characteristics of said circuits, whereby internal modifications can be permanently made by means of control equipment temporarily connected to said interconnection terminal equipment to provide mop-up equalisation for said cable.

14. Attenuation equalisation device for incorporation in a telecommunication cable system comprising a closed housing, attenuation circuits inside said closed housing, two sets of interconnection terminal equipment which are fixed in said closed housing so as to extend internally and externally thereof and which are connected internally to said attenuation circuits and are arranged externally for permanent connection respectively to incoming and outgoing cable terminations, and a plurality of sets of interconnection terminal equipment on said closed housing to which control equipment can be temporarily connected, electrical contact-sets in said attenuation circuits the setting of which can be changed from outside said closed housing, and low temperature fuse devices in heating circuits which are selectively closed by said electrical contact sets whereby a selection of said low temperature fuse devices are operated via said selectively-closed heating circuits to make permanent connections in said attenuation circuits.

15. Attenuation equalisation device for incorporation in a telecommunication cable system comprising a closed housing, attenuation circuits inside said closed housing, two sets of interconnection terminal equipment which are fixed in said closed housing so as to extend internally and externally thereof and which are connected internally to said attenuation circuits and are arranged externally for permanent connection respectively to incoming and outgoing cable terminations, and a plurality of sets of interconnection terminal equipment on said closed housing to which control equipment can be temporarily connected, gravity-operated electrical contact-sets in said attenuation circuits the setting of which can be changed from outside said closed housing, and low temperature fuse devices in heating circuits which are selectively closed by said gravity-operated electrical contact sets whereby a selection of said low temperature fuse devices are operated via said selectively-closed heating circuits to make permanent connections in said attenuation circuits.

16. Attenuation equalisation device for incorporation in a telecommunication cable system comprising a closed housing, attenuation circuits inside said closed housing, two sets of interconnection terminal equipment which are fixed in said closed housing so as to extend internally and externally thereof and which are connected internally to said attenuation circuits and are arranged externally for permanent connection respectively to incoming and outgoing cable terminations, and a plurality of sets of interconnection terminal equipment on said closed housing to which control equipment can be temporarily connected, a step-by-step electromagnetic wiper switch incorporated in said attenuation circuits by means of which temporary circuit changes are made in said attenuation circuits, and low-temperature fuse devices in heating circuits which are selectively closed under control of said switch whereby a selection of said low temperature fuse devices are operated via said selectively-closed heating circuits to make permanent connections in said attenuation circuits.

17. Attenuation equalisation device for incorporation in a telecommunication cable system comprising a closed housing, attenuation circuits inside said closed housing, two sets of interconnection terminal equipment which are fixed in said closed housing so as to extend internally and externally thereof and which are connected internally to said attenuation circuits and are arranged externally for permanent connection respectively to incoming and outgoing cable terminations, and a plurality of sets of interconnection terminal equipment on said closed housing to which control equipment can be temporarily connected, gravity-operated electrical contact-sets in said attenuation circuits the setting of which can be changed from outside said closed housing, and low temperature fuse devices in heating circuits which are selectively closed by said gravity-operated electrical contact sets whereby a selection of said low temperature fuse devices are operated via said selectively-closed heating circuits to make permanent connections in said attenuation circuits, and electromagnetic contact-making relays which are operated by said gravity-operated switches, which close said heating circuits and which also close temporary attenuation modifying contacts for test purposes, which temporary contacts are in parallel with corresponding low-temperature fuse devices.

18. Attenuation equalisation device for incorporation in a telecommunication cable system comprising a closed housing, attenuation circuits inside said closed housing, two sets of interconnection terminal equipment which are fixed in said closed housing so as to extend internally and externally thereof and which are connected internally for permanent connection respectively to incoming and outgoing cable terminations, and a plurality of sets of interconnection terminal equipment on said closed housing to which control equipment can be temporarily connected, a step-by-step electromagnetic wiper switch incorporated in said attenuation circuits by means of which temporary circuit changes are made in said attenuation circuits, and low-temperature fuse devices in heating circuits which are selectively closed under control of said switch whereby a selection of said low temperature fuse devices are operated via said selectively-closed heating circuits to make permanent connections in said attenuation circuits, and electromagnetic contact-making relays which are operated by said gravity-operated switches, which close said heating circuits and which also close said temporary attenuation modifying contacts for test purposes, which temporary contacts are in parallel with corresponding low-temperature fuse devices.

References Cited in the file of this patent

UNITED STATES PATENTS

| | | |
|---|---|---|
| 1,369,805 | Hamilton | Mar. 1, 1921 |
| 1,483,179 | Jammer | Feb. 12, 1924 |
| 1,835,080 | Pfleger | Dec. 8, 1931 |
| 2,265,042 | Lundry | Dec. 2, 1941 |
| 2,348,572 | Richardson | May 9, 1944 |
| 2,737,629 | Beerbaum et al. | Mar. 6, 1956 |
| 2,753,526 | Ketchledge | July 3, 1956 |